United States Patent [19]

Choji

[11] Patent Number: 5,607,218
[45] Date of Patent: Mar. 4, 1997

[54] VEHICULAR LAMP HAVING IMPROVED SOCKET COVER

[75] Inventor: Masataka Choji, Shizuoka, Japan

[73] Assignee: Koito Manufacturing Co., Ltd., Tokyo, Japan

[21] Appl. No.: 492,540

[22] Filed: Jun. 20, 1995

[30] Foreign Application Priority Data

Jun. 30, 1994 [JP] Japan .................... 6-173627

[51] Int. Cl.⁶ .................................... F21M 7/00
[52] U.S. Cl. .................. 362/61; 362/80; 362/267
[58] Field of Search ................... 362/61, 80, 226, 362/267

[56] References Cited

U.S. PATENT DOCUMENTS

| | | | |
|---|---|---|---|
| 5,428,510 | 6/1995 | Shirai et al. | 362/80 |
| 5,442,525 | 8/1995 | Tsukada | 362/61 |
| 5,515,245 | 5/1996 | Bobcza et al. | 362/61 |

Primary Examiner—Ira S. Lazarus
Assistant Examiner—Sara Sachie Raab
Attorney, Agent, or Firm—Sughrue, Mion, Zinn, Macpeak & Seas

[57] ABSTRACT

A vehicular lamp having a socket cover which waterproofs a rear opening edge of a lamp body and a bulb socket or a base of a bulb attached to a reflector. A skirt fitted around a rear opening edge of a lighting fixture, and a sleeve fitted around a bulb socket or a base of a bulb projecting to the rear of the reflector are joined via a thin member. An engagement edge is coaxially formed along the inside of the skirt. A stopper flange is formed along the leading end of the engagement edge meshing with a stopper flange formed along the rear opening edge of the lamp body. A number of grooves are circumferentially formed extending parallel to each other along the inner surface of the skirt and the sleeve. Water entering from the rear opening edge of the lamp body is stopped by a recessed groove formed at the bottom between the skirt and the engagement edge and the grooves circumferentially formed along the inner surface of the skirt and the sleeve.

8 Claims, 4 Drawing Sheets

VEHICULAR LAMP HAVING IMPROVED SOCKET COVER

BACKGROUND OF THE INVENTION

The present invention relates to a vehicular lamp of a type having a reflector mounted in a lamp body and a bulb attached to the reflector, in which the angle of the optical axis of the reflector body can be controlled by controlling the tilt angle of the reflector relative to the lamp body. More particularly, the invention relates to a socket cover for a vehicular headlamp which seals a rear opening of the lamp body in such a manner as to prevent water from entering the lamp chamber.

In a conventional headlamp, as shown in FIG. 6, a lamp cavity 52 is defined by a lamp body 50 and a front lens 51 attached to the edge of the front opening of the lamp body 50, and a reflector 53 is provided within the lamp cavity 52. The optical axis of the reflector 53 can be controlled relative to the lamp body 50 by means of an optical axis control device (not shown). A light bulb 56 is mounted on the lamp body 50 via a bulb socket 55 in an opening 54 formed in the rear of the reflector 53, with the filament of the light bulb 56 supported approximately at the focus point F of the reflector 53. It is possible to replace the bulb 56 by removing the bulb socket 55 from the rear of the reflector 53 via a rear opening edge 57 formed in the rear of the lamp body 50.

The bulb socket 55 is hermetically attached to the rear opening edge 57 of the lamp body 50 and the reflector 53 by means of a substantially cylindrical socket cover 58 molded from soft synthetic resin or rubber so as to prevent water from entering the lamp body 50. The socket cover includes a cylindrical portion 59 formed at the center thereof and fitted to the outer periphery of the socket 55 projecting to the rear in relation to the reflector 53, and a skirt portion 61 integrally connected with the cylindrical portion via a thin portion 60 and fitted to the outer periphery of the rear opening edge 57 of the lighting fixture 50. The thin portion 60 absorbs differences in pressure between the outside and inside of the lamp cavity 52 due to temperature changes induced by the turning on and off of the bulb 56, thereby preventing failures caused by pressure changes.

In the conventional socket cover 58 having the structure described above, a stopper projection edge 62 formed along the outer periphery of the rear opening edge 57 of the lamp body 50 is engaged with a stopper groove 63 formed along the inner circumferential surface of the skirt 61 of the socket cover 58, so that the stopper projection edge and the stopper groove are brought into close contact with each other. However, if a large difference in temperature occurs between the inside and the outside of the lamp cavity 52, water, such as rainwater, can be drawn into the lamp cavity 52 through the juncture the stopper projection edge and the stopper groove.

Moreover, the cylindrical portion 59 of the socket cover 58 is merely fitted to the outer periphery of the bulb socket 56 and not permanently sealed thereto. Therefore, the cylindrical portion 59 must be forcefully fitted around the socket 55 by reducing the bore of the cylindrical portion 59 in order to improve the contact between the cylindrical portion and the socket, thereby resulting in a difficult mounting operation.

SUMMARY OF THE INVENTION

The present invention has been made to solve the foregoing problems, and an object of the invention is to provide a socket for vehicular lamp which is more easily mounted to a headlamp as a result of improvements to portions of the socket and a lamp body which are fitted together, and which provides improved mounting as a result of improved contact of the mounting portions, as well as improved waterproofing.

The above as well as other objects have been achieved by a socket cover to be attached to a vehicular lamp including a lamp body having a front opening and a rear opening and defining a lamp cavity, a front lens attached to the front opening edge, a reflector arranged so as to make it possible to pivotally control the optical axis within the lamp body by means of optical axis control means as required, and a bulb socket removably fixed in an opening formed in a rear part of the reflector, the improvement comprising: a cylindrical skirt to be fitted around the rear opening edge of the lighting fixture; a sleeve to be fitted around a bulb socket or a base of a bulb projecting to the rear of the reflector, both the skirt and the sleeve being made integral via a thin member; an engagement edge coaxially formed along the inside of the skirt so as to stand upright; a stopper flange formed along the leading end of the engagement edge so as to mesh with another stopper flange formed along the opening end of the rear opening edge of the lamp body; a plurality of circumferentially formed grooves extending parallel to each other along the inner surface of the skirt and the sleeve; and a gap circumferentially formed between the end of the rear opening edge of the lamp body and the inner surface of the skirt.

The opening edge of the skirt is preferably tapered to the outside and slanted toward the leading edge.

With this structure, even if respiration is brought about by a temperature difference resulting from the lighting of the bulb or a pressure difference occurring in the lamp cavity when the bulb is turned on and off, capillary action in the circumferential direction of the groove causes any water received in the fitted portions to flow in the circumferential direction because the grooves circumferentially formed along the inner surface of the skirt and the sleeve of the socket cover closely engage the outer periphery of the rear opening edge of the lamp body and the outer surface of the base of the bulb. Therefore, it is difficult for water to pass beyond the grooves and enter from the fitted portions, thereby resulting in improved waterproofing.

Moreover, it is unnecessary to extensively reduce the bore of the skirt and the sleeve with respect to the outer diameter of the rear opening edge of the lamp body and the base of the bulb, thereby resulting in improved mounting of the socket cover. The stopper flange formed along the inner periphery of the skirt engages the stopper flange formed along the rear opening edge of the lamp body so as to circumferentially project to the inside. Even if the socket cover is pulled to the rear of the lamp body, the lamp body and the socket cover cannot easily be disengaged from each other at the engagement portions thereof. Therefore, it is possible maintain the lamp body and the socket cover in a stably engaged state. Moreover, a gap is circumferentially formed between the rear opening edge of the lamp body and the inner surface of the skirt, and water will be retained in the gap even if the water enters the skirt, thereby preventing water from entering the lamp chamber.

The lip formed along the opening edge of the leading end of the skirt is sloped to the outside and slanted in the direction of the leading edge, hence serving as a drip edge with respect to water entering from the outside.

DESCRIPTION OF THE PREFERRED EMBODIMENTS

With reference to the drawings, a socket cover constructed in accordance with a preferred embodiment of the present invention now will be described.

Figure 1:
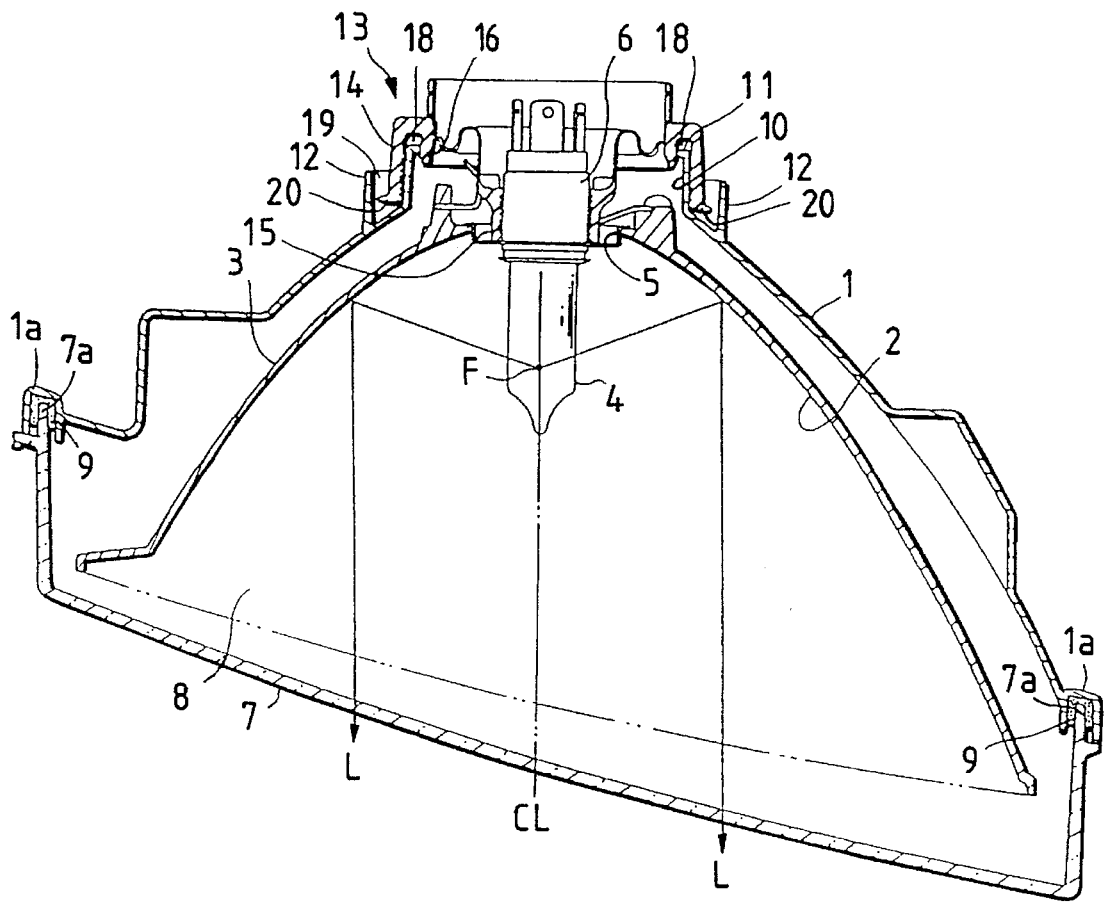
FIG. 1 is a cross-sectional plan view of a headlamp for a vehicle provided with a socket cover according to the present invention.
Figure 2:
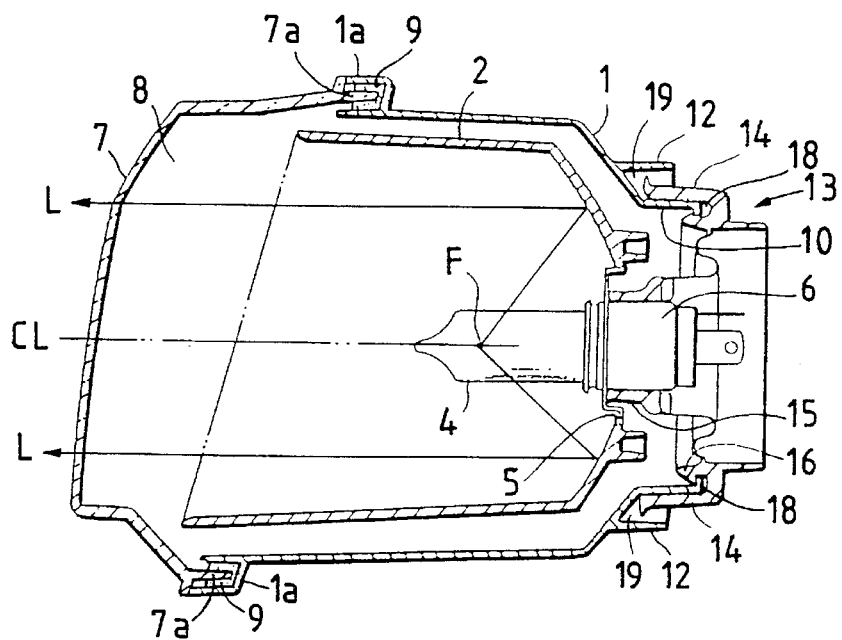
FIG. 2 is a side cross-sectional view of the headlamp shown in FIG. 2.

FIG. 1 is a plan view showing a socket cover mounted to a lamp body of a vehicle headlamp, and FIG. 2 is a longitudinal cross-sectional view of the same.

In the drawings, reference numeral 1 designates a lamp body having a substantially rectangular shape when viewed from the front. The lamp body 1 houses a reflector 3. A rear inner surface of the reflector 3 constitutes a paraboloid mirror 2. A bulb 4 (light source) is mounted in such a way that the filament of the bulb is situated substantially at the focus point F along the optical axis CL of the mirror 2 of the reflector 3. A collimated beam L is emitted upon lighting the bulb 4. The bulb socket 6 of the bulb 4 is removably fixed to a socket fixing hole 5 formed in a rear part of the reflector 3. It is possible to replace the bulb 4 as required by removing the bulb socket 6 from the socket fixing hole 5.

The front opening of the lamp body 1 is covered with a front lens 7 having a substantially rectangular shape, whereby a sealed lamp cavity 8 is formed inside the lamp body. A seal leg 7a integrally formed along the outer periphery of the front lens 7 is fixedly and integrally fitted into a seal groove 1a formed along the outer circumferential edge of the front opening of the lamp body 1 by means of an adhesive 9. The tilt position of the reflector 3 within the lamp body 1 is controlled by means of an optical axis control device (not shown) screwed into the body from a rear end wall of the lamp body 1. That is, the angle of the optical axis CL of the mirror 2 formed on the inner surface of the reflector can be set as desired. In this way, it is possible to obtain the light distribution pattern required for the headlamp.

Figure 3:
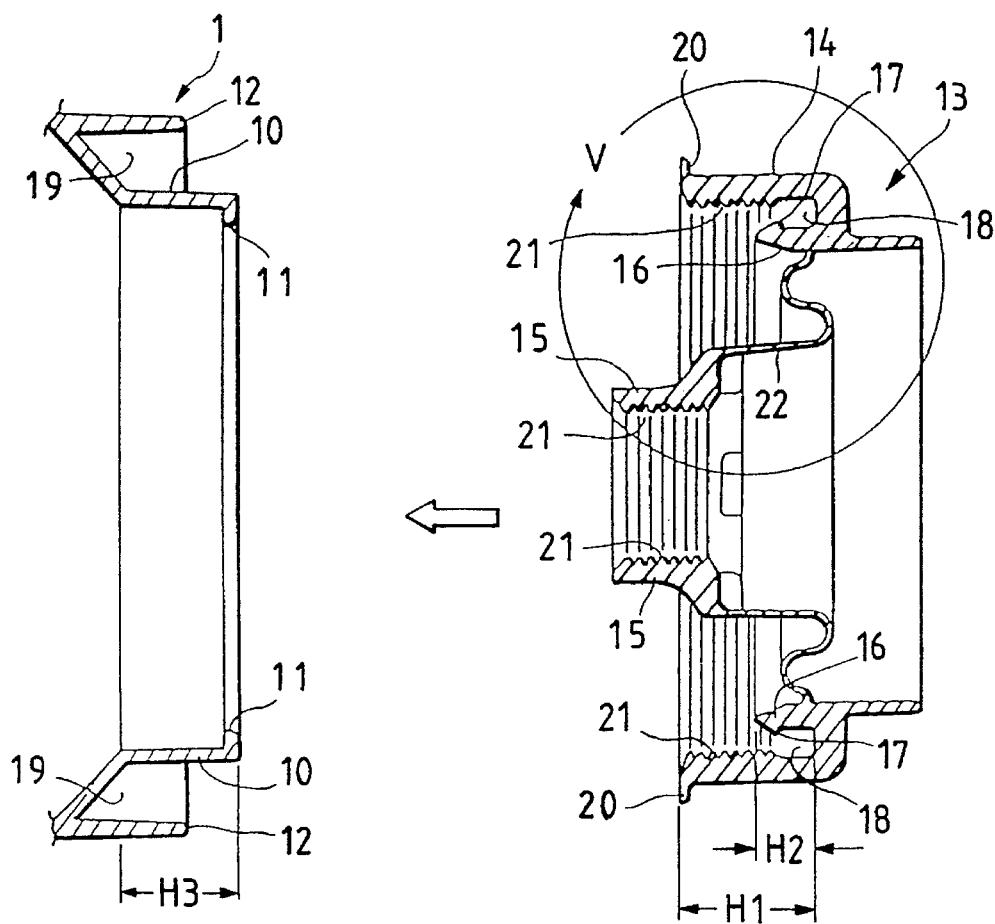
FIG. 3 is a longitudinal cross-sectional view of principal portions showing the structural relationship between a rear opening edge of a lamp body and the socket cover according to the present invention when separated from one another.
Figure 4:
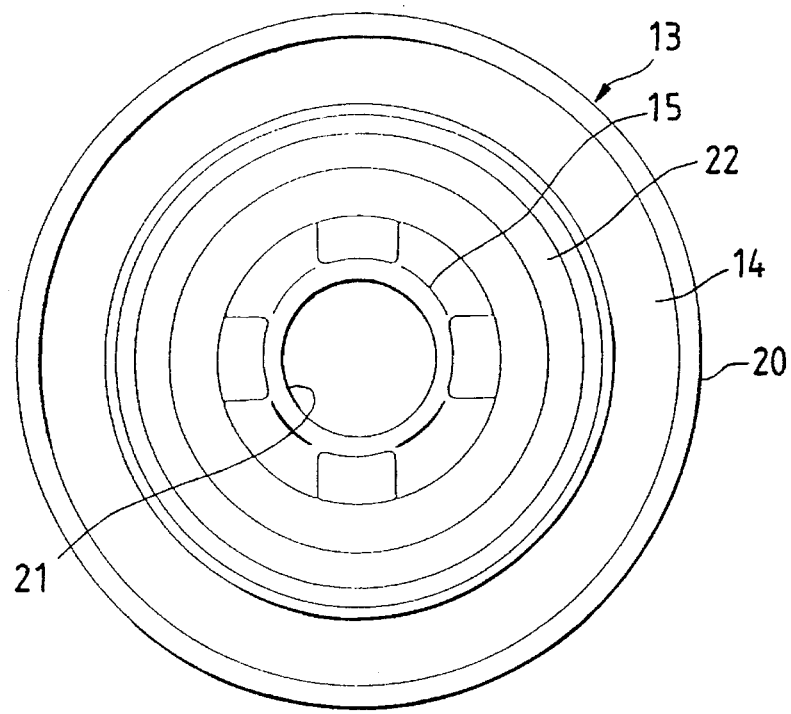
FIG. 4 is a rear view of a socket cover for use with a vehicular lamp.
Figure 5:
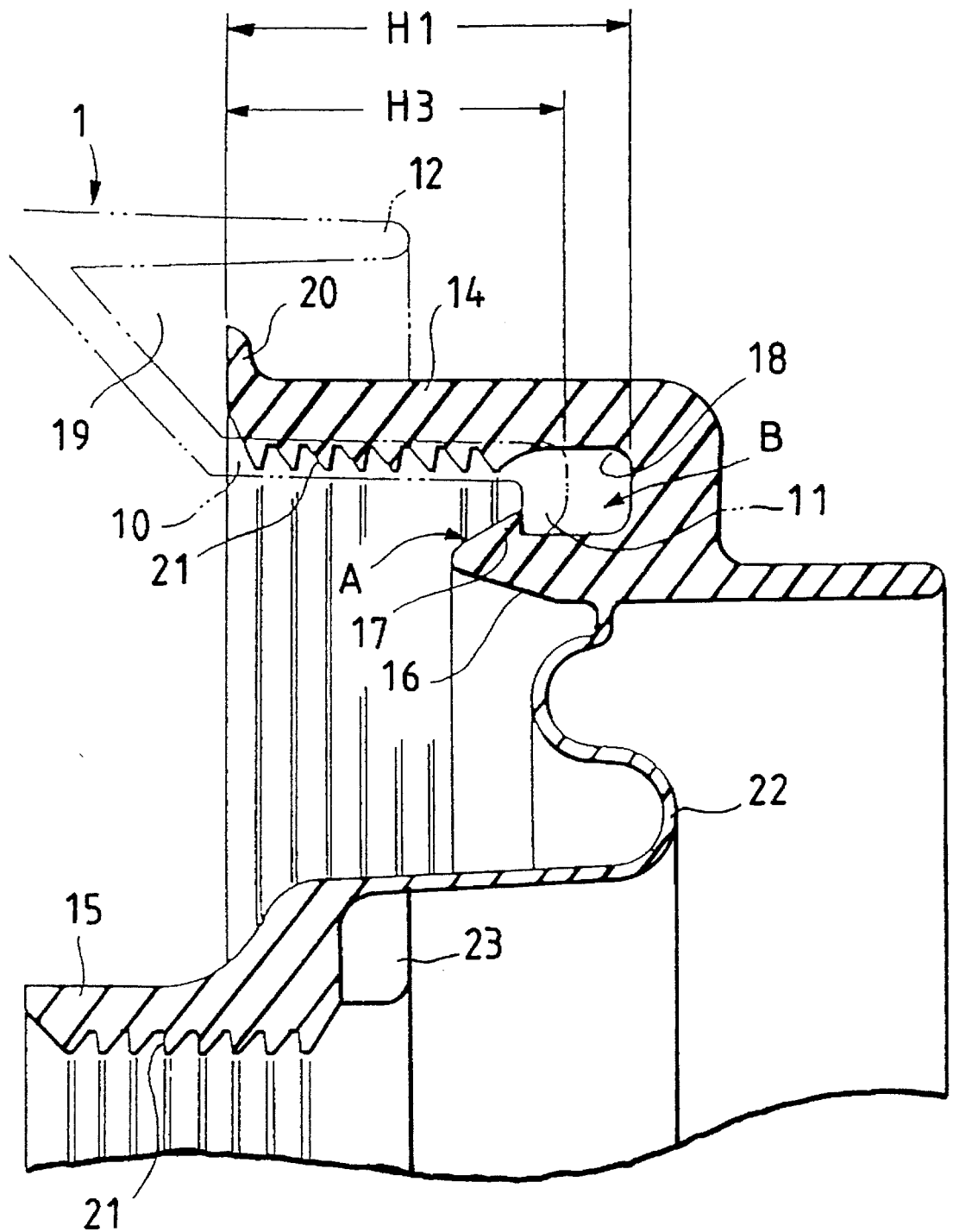
FIG. 5 is an enlarged cross-sectional view of the principal elements designated by V in FIG. 3.
Figure 6:
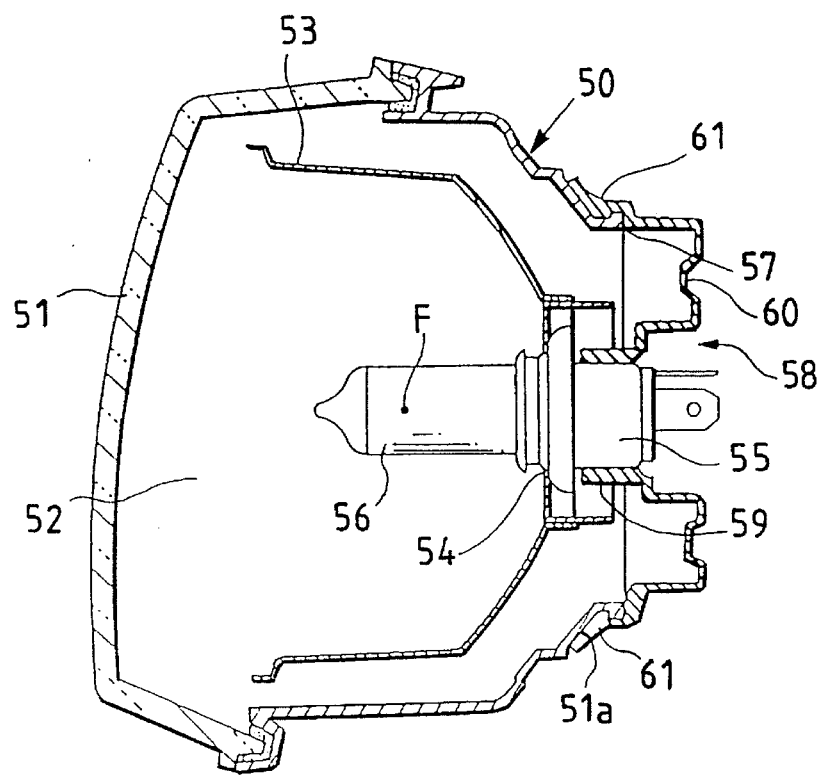
FIG. 6 is a lateral cross-sectional view of a vehicular headlamp provided with a conventional socket cover.
Figure 7:
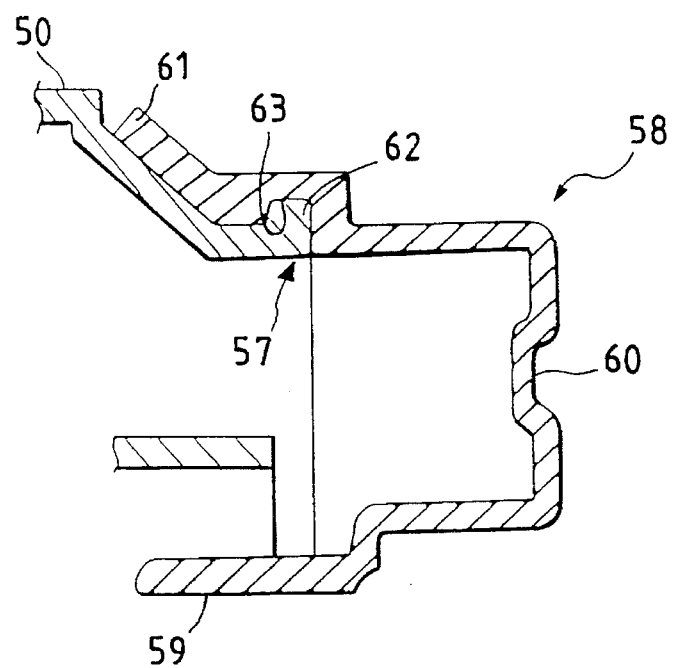
FIG. 7 is an enlarged cross-sectional view of the principal elements of the socket cover shown in FIG. 6.

FIG. 3 is a longitudinal cross-sectional view showing the detailed structure of a socket cover to be fitted to the rear opening edge of the lamp body, FIG. 4 is a rear view of the socket cover, and FIG. 5 is a longitudinal enlarged cross-sectional view of principal parts of the socket cover.

In the drawings, reference numeral 10 designates a substantially cylindrical rear opening edge formed on the rear of the lamp body 1 projecting rearward. A stopper flange 11 is bent from the end of the cylindrical opening so as to project to the radial inside of the opening, and a drip edge 12 is coaxially formed around the outer periphery of the rear opening edge 10. A socket cover 13 to be attached to the rear opening edge 10 of the lamp body 1 having the construction as described is made of a material having flexibility such as synthetic resin or rubber.

The socket cover has a skirt 14 to be fitted around the outer periphery of the rear opening edge 10 of the lamp body, and a sleeve 15 to be fitted around the bulb socket 6 projecting from the rear end of the reflector 3. A cylindrical engagement edge 16 is coaxially formed along the inside of the skirt 14 so as to project a distance less than the skirt 14 (H1>H2). The leading end of the engagement edge 16 has a tapered surface (designated by an arrow A) bulging to the outside, i.e., the skirt 14, and having a downward slope on the leading end. A stopper flange 17 is circumferentially formed along the tapered portion so as to mesh with the stopper flange 11 formed along the rear opening edge 10 of the lamp body 1. A recessed groove 18 is circumferentially formed between the skirt 14 and the engagement edge 16 to fittedly hold the rear opening edge 10 of the lamp body 1. When the skirt 14 is fitted to the rear opening edge 10 of the lamp body 1, the stopper flanges 11 and 17 mesh with each other, thereby preventing the skirt 14 from disengaging from the rear opening edge 10 of the lamp body 1.

The skirt 14 of the socket cover 13 is slightly longer than the length H3 required for the complete fitting of the rear opening edge 10 of the lamp body 1, i.e., that is the skirt 14 has a length H1>H3.

When the stopper flanges 11 and 17 mesh with each other, the projecting edge of the skirt 14 comes into contact with the rear surface of the lamp body 1, i.e., the exterior surface of an upwardly sloped portion of the rear opening edge 10. Even when the stopper flanges 11 and 17 mesh with each other, the leading end of the rear opening edge 10 is not completely fitted into the bottom of the recessed groove 18, whereupon a gap (designated by an arrow B) is circumferentially formed along the bottom of the recessed groove 18. Even if water enters the lamp cavity from the fitted portions between the rear opening edge 10 of the lamp body 1 and the skirt 14, the water will be retained in this gap B, thereby preventing the water from directly entering the interior of the lamp body 1.

A lip 20 is formed along the leading end of the skirt 14. The lip 20 is fitted into a recess 19 formed between the rear end opening edge 10 of the lamp body 1 and the drip edge 12. The opening of the lip 20 is circumferentially sloped to the outside and is slanted to the leading end. When the socket cover 13 is attached to the rear opening edge 10 of the lamp body 1, the lip 20 of the skirt 14 is inserted inside the drip edge 12 formed on the lamp body 1. Thus, the drip edge 12 surrounds the lip 20, preventing water from entering the lamp body. Moreover, the lip 20 itself is slanted outward, thereby preventing water from going over the lip 20 and entering the recess 19 of the lamp body 1.

A plurality of grooves 21 are formed along the inner periphery of the skirt 14 and the sleeve 15 which constitute the socket cover 13. These grooves 21 do not come into surface contact with the outer peripheral surface of the rear opening edge 10 and the bulb socket 6 of the lamp body 1 to which the socket cover is fitted. Therefore, the grooves facilitate the attachment and removal of the socket cover. Moreover, the top of each of the grooves 21 circumferentially comes into line contact with the outer peripheral surface of the rear opening edge 10 and the bulb socket 6, thereby preventing water movement toward the inside of the lamp body 1 due to capillary action along the contact surface between the socket cover and the lamp body. Capillary action occurs along the circumference of each groove 21 toward the base of each groove 21, thereby preventing water from passing over the top of the groove 21 and entering the interior of the lamp body 1.

As a matter of course, the width of the groove 21 and the depth of the base thereof can be set according to various conditions, for example, the type of lighting fixture, the material of the lamp body 1, the length of the rear opening edge 10, and the material of the socket cover 13.

The space between the skirt 14 and the sleeve 15 of the socket cover 13 having the above-described structure is appropriately sealed by a thin member 22 having flexibility. The sleeve 15 of the socket cover 13 is situated at the center of the thin member 22, whereby the sleeve and the thin member are coaxially arranged. The thin member 22 acts as a diaphragm, absorbing and compensating pressure differences resulting from the turning on and off of the bulb 4. For this purpose, the thin member has a corrugated cross-section so as to absorb pressure differences occurring in the lamp body 1 so that water cannot enter the lamp body from the outside. In other words, the thin member 22 expands or contracts in the forward and rearward directions of the lamp body 1 as the pressure changes, equalizing the pressure between the interior and the exterior of the lamp body 1.

Reference numeral 23 designates a rib for strengthening the joint of the thin member 22 connected to the sleeve 15. In this embodiment, four ribs 23 are spaced along the circumference of the thin member so as to stand upright.

A detailed explanation of the bulb 4 attached to the socket 6 and the sleeve 15 of the socket cover 13 fitted around the outer periphery of the socket 6 projecting to the rear of the socket fixing hole 5 of the reflector 3 has been provided. However, it is not necessary to attach the bulb 4 to the socket 6. As a matter of course, the base of the bulb 4 can be directly projected to the rear of the reflector 3, and the sleeve 15 of the socket cover 13 can be fitted around the base of the bulb 14.

With the socket cover of the present invention constituted in the manner previously described, the mounting of the socket cover to the lamp body is improved. The skirt constituting the socket cover is closely fitted to the rear opening edge of the lamp body, and the sleeve of the socket cover is securely and closely fitted to the outer periphery of the socket or the base of the bulb. Various features of the waterproof structure of the socket cover act to prevent water from entering the lamp body, and hence the waterproof property of the socket cover is improved.

What is claimed is:

1. A vehicular lamp comprising: a lamp body having a front opening and a rear opening; a front lens covering the front opening of said lamp body and defining a lamp body cavity with said lamp body; a tiltable reflector mounted in said lamp body; a bulb socket removably fixed to an opening formed in a rear part of said reflector; a bulb mounted in said bulb socket; a cylindrical skirt formed around a rear opening edge of said lamp body; a sleeve formed around at least one of said bulb socket and a base of said bulb and projecting to the rear of said reflector; a thin member integrally joining said skirt and said sleeve; an engagement edge coaxially formed along an inside of said skirt so as to stand upright; a first stopper flange formed along an opening end of said rear opening edge of the lamp body; and a second stopper flange formed along a leading end of said engagement edge and meshing with said first stopper flange, a plurality of circumferential grooves extending parallel to each other being formed along an inner surface of said skirt and said sleeve, and a gap being circumferentially formed between an end of said rear opening edge of said lamp body and an inner surface of the skirt.

2. The vehicular lamp as defined in claim 1, wherein said opening edge of said skirt is tapered to the outside and slanted toward said leading end of said engagement edge.

3. A vehicular lamp comprising: a lamp body having a front opening and a rear opening; a front lens covering the front opening of said lamp body and defining a lamp body cavity with said lamp body; a tiltable reflector mounted in said lamp body; a bulb socket removably fixed to a rear opening formed in a rear part of said reflector; a bulb mounted in said bulb socket; a cylindrical skirt formed around an edge of said rear opening of said lamp body; a substantially cylindrical rear opening edge formed on a rear of said lamp body around said rear opening and projecting rearward; a first stopper flange extending radially inward from an end portion of said cylindrical rear opening edge; a drip edge coaxially formed around an outer periphery of said rear opening edge; a socket cover attached to said rear opening edge, said socket cover being made of a flexible material, said socket cover having a skirt fitted around an outer periphery of said rear opening edge, a sleeve fitted around said bulb socket projecting from the rear end of said reflector, a cylindrical engagement edge coaxially formed along the inside of said skirt projecting a distance less than said skirt, a leading end of said engagement edge having a tapered surface bulging to an outside of said skirt and having a downward slope on a leading end thereof, a second stopper flange circumferentially formed along said tapered surface as to mesh with said first stopper flange, a recessed groove being circumferentially formed between said skirt and said engagement edge, and a thin flexible member joining said skirt and said sleeve.

4. The vehicular lamp of claim 3, wherein said skirt of said socket cover is slightly longer than a length required for complete fitting of said rear opening edge of said lamp body into a bottom of said recessed groove.

5. The vehicular lamp of claim 4, further comprising a lip formed along a leading end of said skirt, said lip being fitted into a recess formed between the rear end opening edge of said lamp body and said drip edge, the opening of said lip being circumferentially sloped to the outside and being slanted to a leading end of said lip, said lip being inserted inside said drip edge with said drip edge surrounding said lip.

6. The vehicular lamp of claim 4, wherein a plurality of grooves are formed along an inner periphery of said skirt and said sleeve, a top of each of said grooves being in circumferential line contact with the outer peripheral surface of said rear opening edge and said bulb socket.

7. The vehicular lamp of claim 4, wherein said thin flexible member has a corrugated cross section.

8. The vehicular lamp of claim 7, further comprising a plurality of ribs spaced along the circumference of the thin member.

* * * * *